United States Patent

Hollitt et al.

[11] Patent Number: 5,846,510
[45] Date of Patent: Dec. 8, 1998

[54] REGENERATION OF HYDROCHLORIC ACID

[75] Inventors: Michael John Hollitt; Ross Alexander McClelland, both of Victoria, Australia

[73] Assignee: Technological Resources Pty Ltd, Melbourne, Australia

[21] Appl. No.: 893,184

[22] Filed: Jul. 15, 1997

Related U.S. Application Data

[63] Continuation of Ser. No. 90,089, filed as PCT/AU92/00625 Nov. 23, 1992 published as WO93/10038 May 27, 1993, abandoned.

[30] Foreign Application Priority Data

Nov. 22, 1991 [AU] Australia .................. PK9653

[51] Int. Cl.⁶ .................................................. C01B 7/01
[52] U.S. Cl. ...................... 423/488; 423/83; 423/DIG. 1; 429/129
[58] Field of Search .................... 423/481, 488, 423/DIG. 1, 83, 633; 422/129

[56] References Cited

U.S. PATENT DOCUMENTS

| | | | |
|---|---|---|---|
| 3,529,931 | 9/1970 | Moklebust | 423/481 |
| 3,852,430 | 12/1974 | Lienau et al. | 423/481 |
| 4,083,693 | 4/1978 | Hansen | 423/154 |
| 4,178,176 | 12/1979 | Tolley | 423/83 |

FOREIGN PATENT DOCUMENTS

| | | | |
|---|---|---|---|
| 64590 | 7/1975 | Australia | 423/83 |
| 3521632 | 12/1986 | Germany | 423/488 |

OTHER PUBLICATIONS

Conners, "Hydrochloric Acid Regeneration as Applied to the Steel & Mineral Processing Industries", CIM Bulletin, Feb. 1975, pp. 75–81.

*Primary Examiner*—Ngoc-Yen Nguyen
*Attorney, Agent, or Firm*—Dennison, Meserole, Pollack & Scheiner

[57] ABSTRACT

A process for forming an aqueous chloride leachant from a spent aqueous chloride leach liquor which process comprises passing a spent aqueous chloride leach liquor and gases containing hydrogen chloride through a preconcentrator to form a concentrated aqueous chloride leach liquor by partial evaporation of water therefrom and absorption of hydrogen chloride; withdrawing a portion of the concentrated aqueous chloride leach liquor; roasting the remainder of the concentrated aqueous chloride leach liquor to generate a metal oxide, and gases containing hydrogen chloride; and passing the gases containing hydrogen chloride to the preconcentrator.

12 Claims, 1 Drawing Sheet

REGENERATION OF HYDROCHLORIC ACID

This is a continuation of application Ser. No. 08/090,089 filed as PCT/AU92/00625 Nov. 23, 1992 published as WO93/10038 May 27, 1993, now abandoned.

BACKGROUND OF THE INVENTION

1. Field of the Invention

The present invention relates to the regeneration of hydrochloric acid used in processing ores to recover mineral products therefrom.

2. Description of the Related Art Including Information Disclosed Under 37 CFR §1.97–1.99.

Sulphuric acid has been the acid most commonly used in the leaching and digestion of ores for the recovery of mineral products therefrom. Principally this is related to the low cost of sulphuric acid manufacture and use and the ease with which sulphuric acid could be transported from the point of production to the point of use. However, with the development of acid resistant plastics, it became feasible to transport hydrochloric acid, which for some applications is more suitable for the leaching and digestion of ores for the recovery of mineral products therefrom.

The development of a spray roasting process for recovering hydrochloric acid from spent leach liquors has given added impetus to the use of hydrochloric acid in hydrochemical treatment of ores for the recovery of mineral products. The spray roasting process is described in "Hydrochloric Acid Regeneration", as distributed by Babcock Contractors Limited. Essentially the process involves passing spent aqueous chloride leach liquors through a preconcentrator to form a concentrated spent aqueous chloride liquor by partial evaporation of water therefrom and spray roasting the concentrated aqueous chloride leach liquor to generate a metal oxide, hydrogen chloride and water vapour therefrom. Spray roaster gases are cooled by direct contact with chloride liquors in the preconcentrator. The hydrogen chloride gas exiting the preconcentrator is recovered by absorption in water to form regenerated hydrochloric acid which can then be used to leach or digest more ore. Normally the hydrogen chloride evolved from the spray roaster is absorbed in water in a countercurrent absorption column. The water used may be filter cake wash water, although only if weak in chloride strength. In this regeneration process only those quantities of hydrochloric acid that are lost due to the formation of chlorides that cannot be thermally decomposed have to be replaced by fresh hydrochloric acid. Chlorides that cannot be thermally decomposed include some alkaline and alkaline earth metal chlorides.

Spray roasting is often performed in a tower. Spent liquor is sprayed in at the top of the tower through one or more nozzles. Hot gases generated by combustion of oil or natural gas in burners located externally of the tower are blasted tangentially into the tower thus producing a rotational flow inside the tower. Initially water evaporates from the droplets formed by the nozzles as the droplets fall through the tower. As the chloride solution becomes more concentrated chloride crystals form which ultimately decompose into water vapour, hydrogen chloride and metal oxide. A typical equation for the decomposition of chlorides in this way can be written as follows:

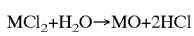

$$MCl_2 + H_2O \rightarrow MO + 2HCl$$

where M is a divalent metal.

In other arrangements spray roasting is conducted in a fluidised bed.

Gases evolved from the spray roaster are then passed through the preconcentrator which normally consists of either
- a packed column through which the gases evolved by the spray roaster pass upwardly and spent liquid is introduced at the top of the tower and flows downwardly into the spray roaster, or
- a void tower in which cocurrent contact of gas and liquid is encouraged.

In this way heat from the spray roasting step is used to concentrate the spent liquor before it passes to the spray roaster thereby improving the energy efficiency of the total process.

The method of operation of spray roasting as described and commonly operated, eg. for acid recovery from steel pickling liquors or from ilmenite leach liquors, results in a maximum recycled acid strength equivalent to the azeotrope. Since the azeotrope occurs at an acid strength of 20 wt % HCl, four units of water per unit of HCl must be added into the absorber to be recycled in the acid. That is, the minimum water evaporation requirement in regeneration of used acid is four units per unit of useful HCl. The high heat input requirements in spray roasting for this water evaporation renders acid regeneration uneconomical for many potential applications and is a major commercial disincentive for the use of hydrochloric acid in leach processing. Alternative schemes for the production and use of superazeotropic acid require concentration of chloride liquors by evaporation prior to acid regeneration, with little or no saving in energy costs. Such schemes are not favoured where superazeotropic acid is not required, as is the case for most applications.

Hydrochloric acid has been used in the production of synthetic rutile from ilmenite and other titaniferous materials by a number of leach processes at both commercial and pilot scales. The processes typically may involve the following steps:

1. Oxidatively roasting ilmenite.
2. Reducing the product of step 1 at elevated temperature.
3. Cooling the product of step 2.
4. Digesting the cooled product of step 2 in hydrochloric acid.
5. Filtering the product of step 4 to produce filtrate and filter cake.
6. Recovering synthetic rutile from the filter cake.
7. Spray roasting the filtrate to recover hydrochloric acid and generate iron oxide for disposal or sale.

An article by H N Sinha of CSIRO (in Titanium '80: Science and Technology, TMS-AIME, New York, 1980, Vol. 3) demonstrates that the addition of ferrous chloride to hydrochloric acid has a beneficial effect on the leaching rate, the production of fines and in the amount of water in the leach liquor. The article also suggests that this information could be used to improve the Murso process by splitting the leach liquor into two streams, one going for regeneration of 20% HCl and the other being recycled and mixed with the regenerated acid to make up the leachant after first undergoing a concentration step to remove excess water. Such a scheme does not significantly reduce the water evaporation requirements in acid regeneration, however.

It has now been discovered that the economics of acid regeneration and formation of leachant can be significantly improved by extracting concentrated spent liquor from the preconcentrator of the usual spray roasting equipment rather than separating the spent liquor streams into one stream passing through the spray roaster and the other through a concentrator.

It is the object of the present invention to provide a means for the regeneration of hydrochloric acid used in leach/digestion circuits, for which the following are requirements:

(i) Process water evaporation requirements should be substantially less than the water addition which would be required to absorb regenerated hydrogen chloride into water as sub azeotropic acid.

(ii) Spent leach liquors are used for absorption of a proportion of regenerated hydrogen chloride and transport of hydrochloric acid back to leach.

SUMMARY OF THE INVENTION

Accordingly, the present invention provides a process for forming an aqueous chloride leachant from a spent aqueous chloride leach liquor which process comprises passing a spent aqueous chloride leach liquor and gases containing hydrogen chloride through a preconcentrator to form a concentrated aqueous chloride leach liquor by partial evaporation of water therefrom and absorption of hydrogen chloride; withdrawing a portion of the concentrated aqueous chloride leach liquor; roasting the remainder of the concentrated aqueous chloride leach liquor to generate a metal oxide, and gases containing hydrogen chloride; and passing the gases containing hydrogen chloride to the preconcentrator.

Gases evolved from the preconcentrator may be contacted with water in an absorber to remove hydrogen chloride therefrom. The resultant hydrochloric acid may be mixed with the withdrawn portion of concentrated aqueous chloride leach liquor.

Since the concentrated spent aqueous chloride leach liquor contains hydrochloric acid absorbed from spray roaster exit gases this acid may be used in leaching without the need to add new water for absorption. Overall the need to add and then evaporate water is reduced.

Preferably the leach liquor is one derived from operation of a leach or pickling process in which case the spent leach liquor largely comprises an aqueous solution of metal chlorides.

In the simplest arrangement existing equipment used for practising the regeneration process can be adapted to the process of the present invention simply by installing an outlet and a control valve at the bottom of the preconcentrator to remove concentrated aqueous chloride leach liquor containing absorbed hydrochloric acid for mixing with regenerated hydrochloric acid and return to leaching/digestion.

The alternative proposed by Sinha would involve the incorporation of a second concentrator, the use of additional heating apparatus for the second concentrator as well as additional pipework. Further, the Sinha proposal does not reduce absorption water inputs or evaporation requirements, as virtually all recycled acid is absorber acid at 20 wt % HCl according to his proposal. This is because there is no possibility of hydrogen chloride absorption into liquors from the second concentrator as proposed. Consequently, the ability to reduce energy consumption via this technique is limited.

In a more complex but more beneficial arrangement for practising the present invention the preconcentrator and roaster are operated in such a manner as to ensure that crystals of a chloride salt are formed via evaporation of water and absorption of hydrogen chloride. The crystals and the bulk of the associated liquor may then be separated (eg. via settling, cycloning, centrifuging or even filtering).

A mixture of the crystals and a predesignated proportion of the preconcentrator liquors may then be fed to a roaster. In the case of the use of a spray tower roaster it will be advantageous if the crystal/preconcentrator liquor mixture is first redissolved by heating to above the crystallisation temperature of the mixture. The resulting liquor may then be sprayed directly through nozzles without fear of blockage by solid crystals.

The advantage of concentration/absorption to the point of crystallisation lies in the introduction of a stream having much higher chloride to water ratio into the roaster. In this manner the roaster energy consumption is reduced and the hydrogen chloride content of the roaster exit gases is increased. The high hydrogen chloride level in the roaster gases assists in ensuring a sufficient level of absorption in the preconcentrator liquors that the liquors separated from the crystals may be used as a leachant or digestant.

In the improved system it will be advantageous (although not essential) to use a countercurrent gas/liquid contactor as a preconcentrator in order to ensure that liquors recycled to leaching or digestion have an acid strength which is as high as can potentially be achieved.

DESCRIPTION OF THE PREFERRED EMBODIMENT(S)

Figure 1:
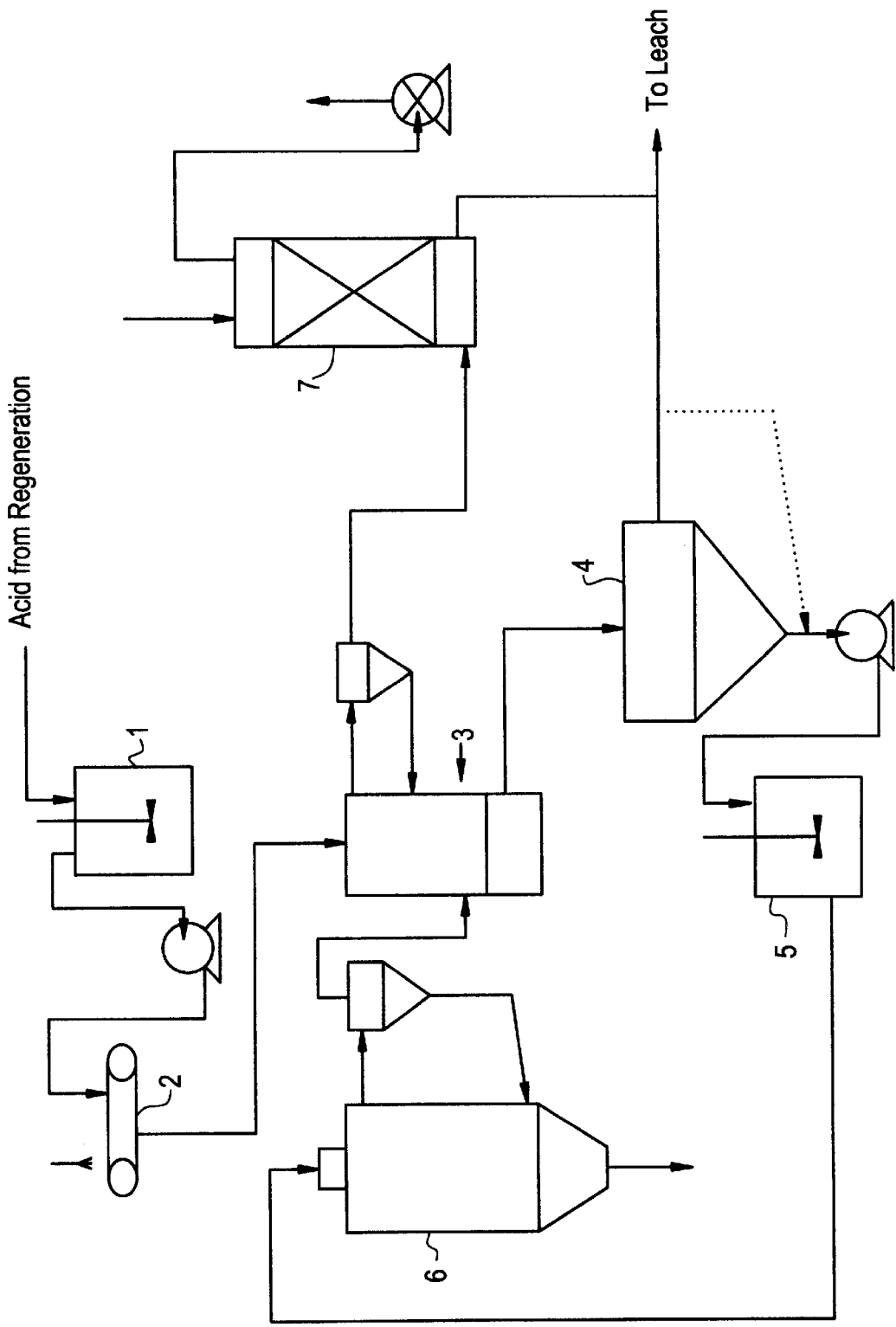
FIG. 1 is a flow diagram illustrating the process and apparatus for operating the process of the present invention.

A preferred embodiment of the invention will now be described with reference to the accompanying drawing which represents a flow diagram.

Appropriate apparatus for performing the process of the present invention may comprise a leach tank/digester 1, a filter 2, a preconcentrator 3, a crystal separator 4, a crystal redissolver 5, a spray roasting tower 6 and an absorption column 7.

Leachant and mineral or other material which has been prepared for leaching/digestion are fed to the digester 1. Spent leach liquor is withdrawn from the digester 1, passed through the preconcentrator 3 and then into the crystal separation system 4. Crystals and a blend of preconcentrator liquor are fed to the redissolver 5, and the resulting liquor passes to the spray roaster 6. Gases evolved from the spray roaster are passed through the preconcentrator 3 counter current to the flow of leach liquor and then through an absorption column 7 where hydrogen chloride not absorbed into preconcentrator liquor is absorbed in water to produce regenerated hydrochloric acid. In addition, concentrated leach liquor is taken from the preconcentrator 3 and fed into the stream of hydrochloric acid extracted from the bottom of the absorption column 7. The mixture of regenerated hydrochloric acid and concentrated leach liquor is then fed back to the digester 1 as leachant.

Systems for which crystallisation is not pursued will not require the crystal separator or redissolver, and liquor in these cases passes directly from the preconcentrator to the spray roaster after a portion has been removed for recycle to leaching/digestion.

In the case where the disclosed acid regeneration process is applied to the leaching of ilmenite or pretreated ilmenite for the production of synthetic rutile the spent leach liquor will contain iron chloride, and possibly other chlorides such as magnesium, manganese and aluminium chlorides. In such cases where crystallisation is pursued the crystals will normally be hydrated ferrous chloride crystals, which contain little of the other chlorides. The proportion of the preconcentrator liquor which is fed to the roaster will in this case be determined to ensure a sufficient bleed of other elements to allow their removal without detrimental impact on the process.

EXAMPLE

The following examples illustrate the absorption of hydrogen chloride into spent leach liquors in order to allow recirculation of the liquors as leachant.

Example 1

One liter of agitated 45% ferrous chloride solution was held at 95° C., and sparged with a mixture of 2 liters per minute of nitrogen and 1.33 liters per minute of hydrogen chloride (volumes measured at 25° C.). After 150 minutes water addition to the resulting crystal slurry was commenced at a rate of 120 mL per hour to maintain constant volume. After 2 hours of further sparging the crystal slurry was permitted to settle and a sample of supernatant liquor was taken. Its composition was as follows:

S.G.: 1.43 gcm$^{-3}$
HCl: 123 gpL
FeCl$_2$: 474 gpL

The gas composition leaving the slurry after two hours was:

HCl: 24% (vol.)
H$_2$O : 40% (vol.)
N$_2$: 36% (vol.)

The supernatant liquor composition represents a very effective leachant, for example for use in leaching of pretreated ilmenite. The hydrogen chloride and water vapour contents of the gas are achievable in roasted of crystal/liquor mixtures for pyrohydrolysis of iron chlorides.

Example 2

A Test was conducted in the same manner as example 1, with the exception that only 0.86 liters per minute of hydrogen chloride was used.

The final liquor composition was:

S.G.: 1.43 gcm$^{-3}$
HCl: 109 gpL
FeCl$_2$: 531 gpL

The final gas composition was:

HCl : 15.4% (vol.)
H$_2$O : 48.7% (vol.)
N$_2$: 35.9% (vol.)

Again, the supernatant liquor will be a very effective leachant and the hydrogen chloride and water vapour contents of the gas are achievable in roasting of crystal/liquor mixtures for pyrohydrolysis of iron chlorides.

The above examples have demonstrated that sufficient acid strengths in liquors exiting a countercurrent preconcentrator can be achieved to render the resulting liquors suitable as leachant, even under conditions of crystallisation, for which hydrogen chloride solubility in liquors is relatively low.

We claim:

1. A process for forming an aqueous chloride leachant from a spent aqueous chloride leach liquor derived from a titaniferous material which process comprises the steps of:

a) passing a spent aqueous chloride leach liquor and hot roaster gases containing hydrogen chloride and water vapor through a preconcentrator to partially evaporate water from and absorb hydrogen chloride in said spent aqueous metal chloride leach liquor and thereby forming a concentrated aqueous acid chloride leach liquor and cooled gases;

b) withdrawing a portion of the concentrated aqueous acid chloride leach liquor and utilizing said portion as a part of an aqueous chloride leachant;

c) roasting the remainder of the concentrated aqueous acid chloride leach liquor to generate a metal oxide and said hot roaster gases containing hydrogen chloride and water vapor therefrom;

d) passing the hot roaster gases containing hydrogen chloride to step a); and e) recovering hydrogen chloride from the cooled gases exiting from the preconcentrator by dissolving in water to form regenerated hydrochloric acid.

2. A process according to claim 1 including the additional step of mixing the regenerated hydrochloric acid with the withdrawn portion of the concentrated aqueous acid chloride leach liquor to form the aqueous chloride leachant.

3. A process according to claim 1 wherein the spent aqueous acid chloride leach liquor is passed through the preconcentrator counter currently to the hot roaster gases containing hydrogen chloride and water vapor.

4. A process according to claim 1 wherein the remainder of the concentrated aqueous acid chloride leach liquor contains metal chloride crystals.

5. A process according to claim 4 wherein the process includes the steps of dissolving the crystals to produce a concentrated solution of a metal chloride and spray roasting the concentrated solution of the metal chloride.

6. A process according to claim 1 wherein the spent aqueous acid chloride leach liquor comprises chlorides of iron and other metals.

7. A process according to claim 1 wherein the spent aqueous chloride leach liquor is derived from leaching ilmenite.

8. Apparatus for forming an aqueous acid chloride leachant from a spent aqueous chloride leach liquor, comprising:

a) preconcentrator means for contacting the spent aqueous chloride leach liquor with hot roaster gases containing hydrogen chloride to evaporate water from the spent aqueous chloride leach liquor thereby forming a concentrated aqueous acid chloride leach liquor and cooled gases;

b) extraction means for extracting concentrated aqueous acid chloride leach liquor from the preconcentrator means and dividing it into first and second portions of concentrated aqueous acid chloride leach liquor;

c) roasting means for roasting the second portion of concentrated aqueous acid chloride leach liquor to produce a metal oxide and said hot roaster gases containing hydrogen chloride;

d) absorption means for absorbing hydrogen chloride in water;

e) first conduit means for conducting said hot roaster gases containing hydrogen chloride generated in the roasting means to the preconcentrator means for contacting the spent aqueous chloride leach liquor;

f) second conduit means for conducting cooled gases containing hydrogen chloride exiting from the preconcentrator means to the absorption means; and g) third conduit means for conducting the first portion of the concentrated aqueous acid chloride leach liquor from the extraction means for use as an aqueous acid chloride leachant, the third conduit means having a valve to control the flow of the first portion of concentrated aqueous acid chloride leach liquor.

9. Apparatus according to claim 8 wherein the roasting means is a spray roaster.

10. Apparatus according to claim 8 wherein the second portion of concentrated aqueous chloride leach liquor contains crystals of metal chloride.

11. Apparatus according to claim 8 additionally comprising means for mixing the aqueous acid chloride leachant with hydrogen chloride absorbed in water in the absorption means.

12. In a process for regenerating an aqueous chloride leach liquor, comprising:

a) passing a spent aqueous chloride leach liquor and a hot roaster gas containing hydrogen chloride and water vapor through a preconcentrator, the hot roaster gas transferring heat to the spent leach liquor to partially evaporate water therefrom with cooling of the gas, thus forming a concentrated spent leach liquor and a cooled gas;

b) roasting the concentrated spent leach liquor to form a metal oxide and generate said hot roaster gas containing water vapor and hydrogen chloride;

c) passing said hot roaster gas from said roasting through said preconcentrator, and removing the cooled gas containing hydrogen chloride from step (a); and d) dissolving the hydrogen chloride from said cooled gas in water to form regenerated hydrochloric acid;

the improvement comprising:

splitting said concentrated spent leach liquor into first and second portions, performing said roasting on said first portion, and withdrawing said second portion and utilizing the second portion as a regenerated aqueous metal chloride leach liquor, thereby increasing the chloride to water ratio in said roasting and increasing hydrogen chloride content in said hot roaster gas to ensure absorption of hydrogen chloride in said preconcentrator in an amount sufficient to enable utilization part of the concentrated spent leach liquor as a leachant.

* * * * *